(12) United States Patent
Ferris et al.

(10) Patent No.: US 10,268,522 B2
(45) Date of Patent: Apr. 23, 2019

(54) SERVICE AGGREGATION USING GRADUATED SERVICE LEVELS IN A CLOUD NETWORK

(75) Inventors: James Michael Ferris, Cary, NC (US); Gerry Edward Riveros, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 840 days.

(21) Appl. No.: 12/628,112

(22) Filed: Nov. 30, 2009

(65) Prior Publication Data
US 2011/0131306 A1    Jun. 2, 2011

(51) Int. Cl.
*G06F 9/50* (2006.01)
*H04L 29/08* (2006.01)
*H04L 12/911* (2013.01)

(52) U.S. Cl.
CPC .......... *G06F 9/5072* (2013.01); *G06F 9/5061* (2013.01); *G06F 9/5077* (2013.01); *H04L 47/72* (2013.01); *H04L 67/10* (2013.01)

(58) Field of Classification Search
CPC . H04L 41/50; H04L 41/5061; H04L 41/5074; H04L 47/72; H04L 67/10; G06F 9/5072; G06F 9/5061; G06F 9/5077
USPC ........................................................ 709/223
See application file for complete search history.

(56) References Cited

U.S. PATENT DOCUMENTS

| | | | |
|---|---|---|---|
| 6,205,579 B1 * | 3/2001 | Southgate | ...................... 717/173 |
| 6,463,457 B1 | 10/2002 | Armentrout et al. | |
| 6,532,488 B1 * | 3/2003 | Ciarlante et al. | ............. 709/205 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,904,875 B2 * | 3/2011 | Hegyi | ........................... 717/103 |
| 7,962,545 B2 | 6/2011 | Knauerhase et al. | |
| 8,935,692 B2 | 1/2015 | Ferris | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — John M Macilwinen
(74) *Attorney, Agent, or Firm* — Lowenstein Sandler LLP

(57) ABSTRACT

Embodiments relate to systems and methods for service aggregation using graduated service levels in a cloud network. In embodiments, a service aggregation platform can encode a service delivery profile to manage the delivery of support services to both vendors, such as independent software vendors (ISVs), and their users in a cloud-based network or networks. Vendors may choose to host their technical support and related services in the service aggregation platform, and define a graduated set of levels of service to which their customers, subscribers, and/or other users may be registered or entitled Users of virtual machines hosted in the one or more cloud can receive technical support, help desk, updating, and/or other support directly from the service aggregation platform, or indirectly through the vendor. The aggregation platform can serve as a trusted portal for delivery of software certification, dependency testing, issue resolution, and/or other degrees or types of support.

21 Claims, 5 Drawing Sheets

(56) References Cited

U.S. PATENT DOCUMENTS

| | | | |
|---|---|---|---|
| 2001/0039497 A1 | 11/2001 | Hubbard | |
| 2002/0038356 A1* | 3/2002 | Mager | G06Q 10/087 709/217 |
| 2002/0069276 A1 | 6/2002 | Hino et al. | |
| 2002/0165819 A1 | 11/2002 | McKnight et al. | |
| 2002/0194047 A1* | 12/2002 | Edinger et al. | 705/9 |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0236820 A1* | 11/2004 | Flocken | 709/200 |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2006/0294389 A1* | 12/2006 | Sladek | G06Q 10/10 713/182 |
| 2007/0011199 A1* | 1/2007 | Hunt | G06F 21/53 |
| 2007/0011291 A1 | 1/2007 | Mi et al. | |
| 2007/0027987 A1* | 2/2007 | Tripp | H04L 29/06 709/225 |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0201711 A1 | 8/2008 | Amir | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0043882 A1* | 2/2009 | Hibbets | G06Q 10/10 709/224 |
| 2009/0089078 A1 | 4/2009 | Bursey | |
| 2009/0099940 A1 | 4/2009 | Frederick et al. | |
| 2009/0125880 A1* | 5/2009 | Manolescu | G06F 8/24 717/110 |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1* | 12/2009 | Friedman | G06F 11/3664 718/104 |
| 2009/0300719 A1 | 12/2009 | Ferris | |
| 2009/0328181 A1* | 12/2009 | Ye | H04L 41/5054 726/9 |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0061250 A1* | 3/2010 | Nugent | 370/242 |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0190469 A1* | 7/2010 | Vanderveen | H04L 12/14 455/406 |
| 2010/0192144 A1* | 7/2010 | Schmit | 717/173 |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0041126 A1* | 2/2011 | Levy et al. | 718/1 |
| 2011/0113007 A1* | 5/2011 | Buckley | G06F 17/30702 707/607 |
| 2011/0131335 A1 | 6/2011 | Spaltro et al. | |

OTHER PUBLICATIONS

Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al.,"Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

(56) References Cited

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation information Using Cloud-Aware Kernel of Operating System", U.S. Appl. No. 13/149,760, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113 filed May 28, 2009.
DeHaan, "Methods and Systems for Automated Scaling of Cloud Computing Systems", U.S. Appl. No. 12/474,707 filed May 29, 2009.
DeHaan, "Methods and Systems for Securely Terminating Processes in a Cloud Computing Environment", U.S. Appl. No. 12/550,157 filed Aug. 28, 2009.
DeHaan et al., "Methods and Systems for Flexible Cloud Management Including External Clouds", U.S. Appl. No. 12/551,506 filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113 filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via A Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Morgan, "Systems and Methods for Generating Optimized Resource Consumption Periods for Multiple Users on Combined Basis", U.S. Appl. No. 13/037,359, filed Mar. 1, 2011.

(56) References Cited

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

U.S. Appl. No. 12/125,587, Notice of Allowance dated Sep. 10, 2014, 7 pages.

* cited by examiner

SERVICE AGGREGATION USING GRADUATED SERVICE LEVELS IN A CLOUD NETWORK

FIELD

The present teachings relate to systems and methods for service aggregation using graduated service levels in a cloud network, and more particularly to platforms and techniques for defining, managing, and delivering technical support services for software applications provisioned though a cloud network via an independent or separate service aggregation platform available to both vendors and users in the cloud.

BACKGROUND OF RELATED ART

Support platforms exist which can assist with the management and delivery of technical support services for software and other products. For example, it is not uncommon for an independent software vendor (ISV) to maintain a help desk, Web site, and/or other resource to permit users of the ISV's software products to receive updates, resolve bugs or compatibility issues, and/or otherwise use and maintain the software products.

The increasing prevalence of cloud-based networks and vendors providing software products to users in those cloud communities has engendered new issues for technical support for those applications in that environment. For one, many ISVs who operate in the cloud environment may not be able to efficiently provide or combine support services for all their products across all their users and/or across all clouds. Different cloud networks in which user-level virtual machines operate may, for instance, be supported by different underlying hardware resources, present different compatibility issues, and/or otherwise require higher-level support than one vendor may be willing or able to effectively provide. ISVs may also lack resources or desire to provide multi-tier support over multiple levels, including to track the service entitlements of a constantly shifting set of end-users in the cloud. As another point, an ISV may or may not be able to validate the operation of their software products on various types or combinations of cloud networks, so that existing or potential users may not avail themselves of a trusted certification service. It may be desirable to provide methods and systems for service aggregation using graduated service levels in a cloud network, wherein vendors such as ISVs or others can define, access, and deliver software support levels to users across a range of cloud environments, providing security, validation, and other services without the necessity of building or maintaining a dedicated support infrastructure.

DESCRIPTION OF EMBODIMENTS

Embodiments of the present teachings relate to systems and methods for service aggregation using graduated service levels in a cloud network. According to aspects, embodiments relate to platforms and techniques for establishing and maintaining a set of defined support services for one or more users in a cloud-based network via a service aggregation platform which can combine, manage, and deliver software support services to an entire set of users of various software applications or other products. In aspects, the service aggregation platform can be independent of any one ISV or other vendor, and maintain a service delivery profile for each participating vendor as well as their end-users to establish service entitlements across multiple levels. In aspects, the set of service entitlements can encompass the type, frequency, volume, cost, and/or other service variables by which one or more end users can access technical support resources provided or hosted by each ISV for their respective products. In aspects, the service aggregation platform can manage the process of receiving support requests, sorting those requests according to service entitlements and/or other criteria, and delivering solutions based on the available resources for each ISV, user, and/or product. In aspects, the management and delivery of support services can be allocated by on a set or series of service levels to which various users, and/or each ISV itself, may be entitled.

The service aggregation platform can, for example, manage support requests through a series of escalations through different levels of support, such as receipt of an initial support ticket, attempted resolution, forwarding to the ISV with a request for research, validation against cloud network configurations, and/or other levels or types of service. Each ISV can itself have a service delivery profile or set of criteria which identify the types or levels of service which can be provided to registered users of that ISV's software or other products via the service aggregation profile. In aspects, the support activity can be delivered by, from, and/or via the set of ISVs, by, from, and/or the service aggregation platform, and/or by, from, and/or via third-party or other support services or entities, or any combination thereof.

Figure 1:
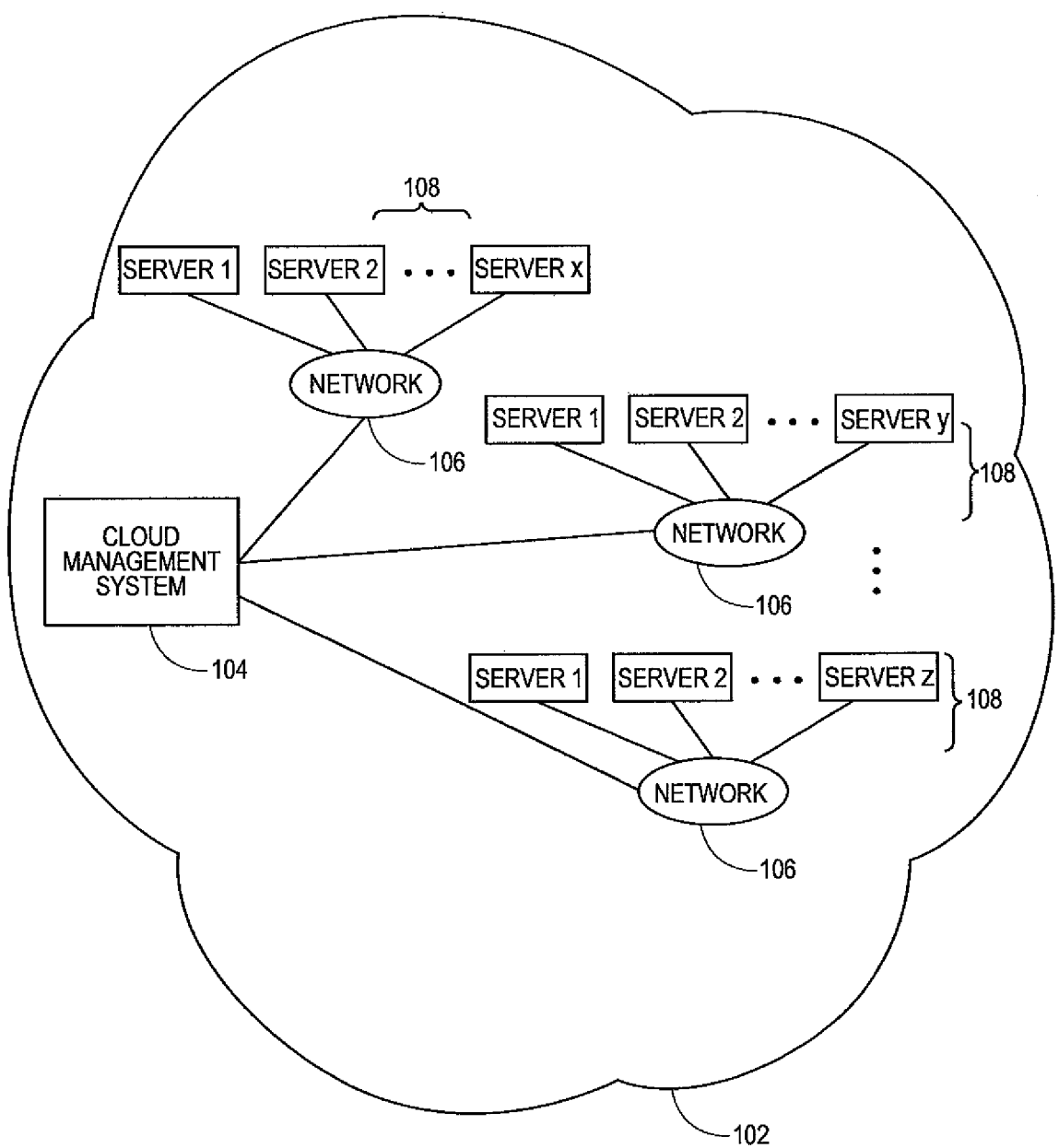
FIG. 1 illustrates an overall cloud system architecture in which various embodiments of the present teachings can be practiced.

Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
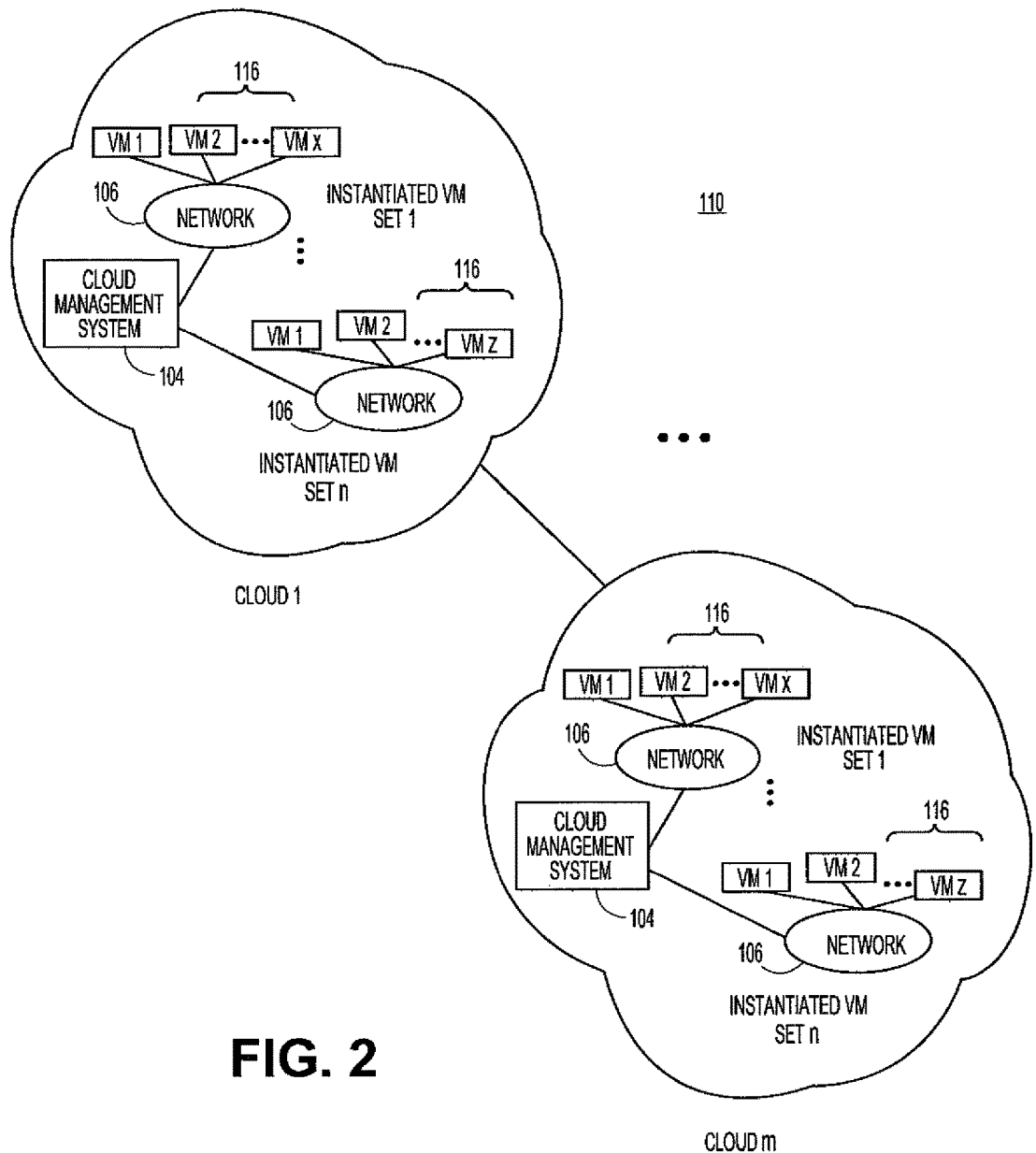
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 114 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated clients 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the main cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
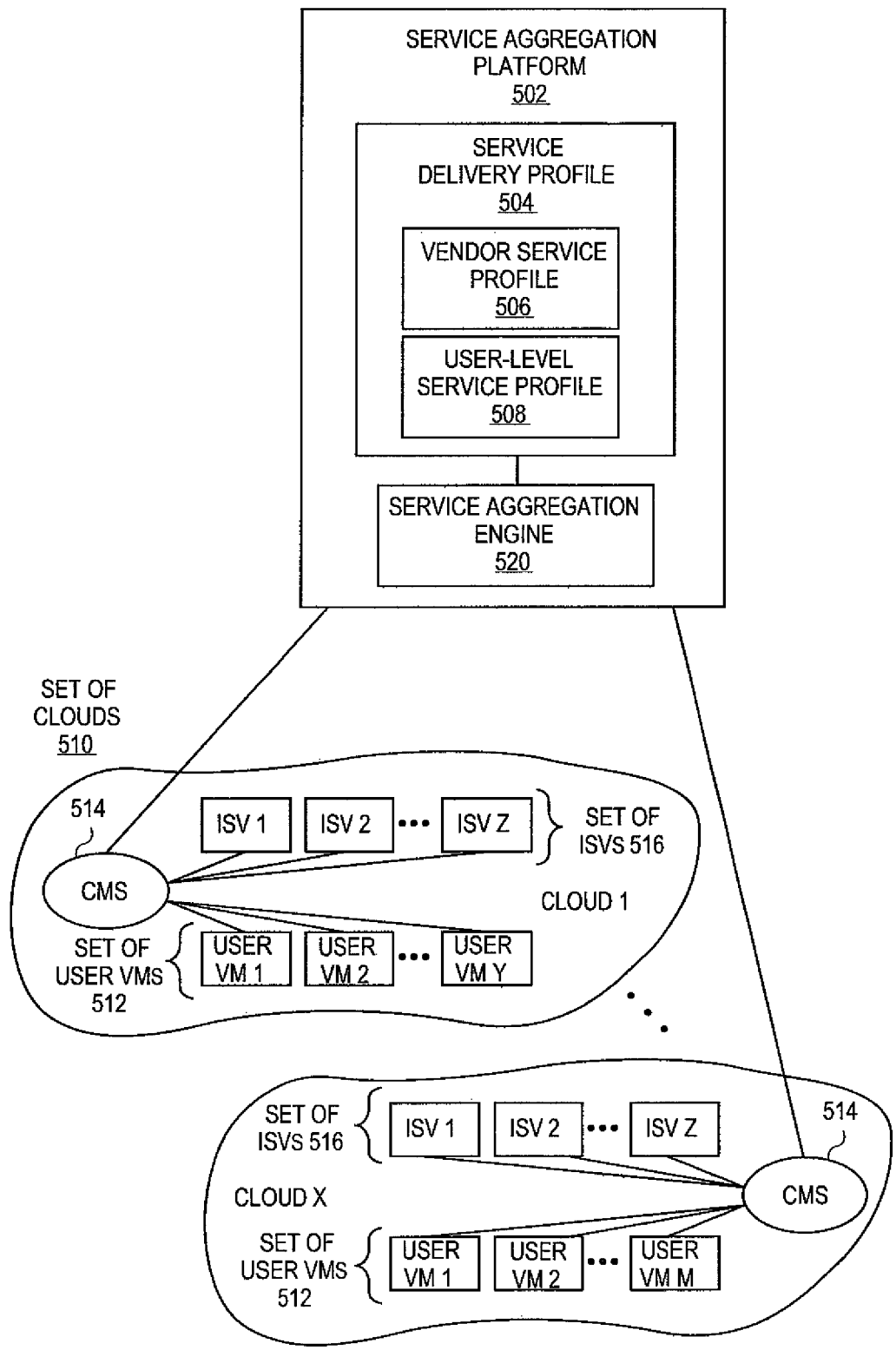
FIG. 3 illustrates a network configuration in which a cloud service aggregation platform and other resources can perform various service definition and delivery functions, according to various embodiments.

FIG. 3 illustrates an exemplary network diagram of a network configuration that can be used in systems and methods for service aggregation using graduated service levels in a cloud network, according to embodiments of the present teachings. In embodiments as shown, a set of cloud networks 510 can communicate with a service aggregation platform 502 to establish, define, and manage the delivery of support services to, via, and/or on behalf of a set of independent software vendors (ISVs) 516 located in or accessible to one or more cloud network in set of cloud-based networks 510. In aspects, service aggregation platform 502 can host or maintain storage, processing, communication, and/or other resources to coordinate and manage the delivery of technical support services to vendors and users in set of cloud-based networks 510. In aspects, service aggregation platform 502 can comprise, host, or access a service provisioning engine 520 such as a server or other processor, software applications, and/or other logic to communicate with set of independent software vendors (ISVs) 516, set of user virtual machines 512, and/or other machines, hosts, nodes, or resources. In embodiments, set of independent software vendors (ISVs) 516 can comprise one or more vendors who download, provision, or otherwise deliver software applications, or other software, hardware, or other products or services to users hosted in set of cloud-based networks 510. In aspects, those users can be users of one or more set of user virtual machines 512 located in one or more cloud in set of cloud-based networks 510. In aspects, each vendor in set of independent software vendors (ISVs) 516 can deliver software product(s) and/or maintain users in one or multiple cloud, and/or across multiple products and/or product lines. In aspects, each cloud can be managed and supported by one or more cloud management system in a set of cloud management systems 514, such as cloud management systems of a type described herein, and/or others.

According to embodiments, each vendor in set of independent software vendors (ISVs) 516 in one or more clouds can register with service aggregation platform 502 to define and deliver services related to its software application(s), the software application(s) of other vendors or entities, and/or other products. In aspects, each vendor can store and register a vendor service profile 506 as part of service delivery profile 504 maintained by service aggregation profile 504. Vendor service profile 506 can define a set or range of services to which each particular vendor will be entitled from or via service aggregation platform 502. For instance, vendor service profile 506 can indicate that a given vendor is entitled to receive security services from a cloud management system in set of cloud management systems 514. Vendor service profile 506 can for further instance indicate that a vendor or vendors is entitled to receive software validation or certification services, verifying or documenting that the vendors application or applications operate correctly or compatibly with a given cloud network with its attendant hardware, software, and other resources. In aspects, vendor service profile 506 can for instance further indicate that a vendor or vendors is entitled to receive dependency testing services, performed by service aggregation platform 502 or other resources, to identify software dependencies associated with the vendor's product or products, for instance, to record operating system version requirements for a software application. Other services or support can be provided to vendors in set of independent software vendors (ISVs) 516.

In aspects, service delivery profile can also contain a user-level service profile 508 for one or more users, such as users of set of user virtual machines 512 or others. In aspects, user-level service profile 508 can indicate types, volumes, frequencies, and/or levels or other parameters for support to which those users may be entitled. In aspects, user-level service profile 508 for one or more users can be defined by an associated ISV or other vendor, itself. In aspects, user-level service profile 508 can record or reflect an entitlement to services such as, for example, a security service, a storage service, or a technical support resolution service such as a help desk, Web page support portal, telephone support, update entitlements, and/or other services to which a user may be entitled. In aspects, user-level service profile 508 can reflect a series of levels of support, such as level 1 (L1), level 2 (L2), level 3 L3), and/or other levels or types of service. In aspects, the services to which a user is entitled under user-level service profile 508 can be recorded or registered based on a subscription or registration to software applications delivered by a vendor, to warranty or other service packages, or based on other criteria.

Figure 4:
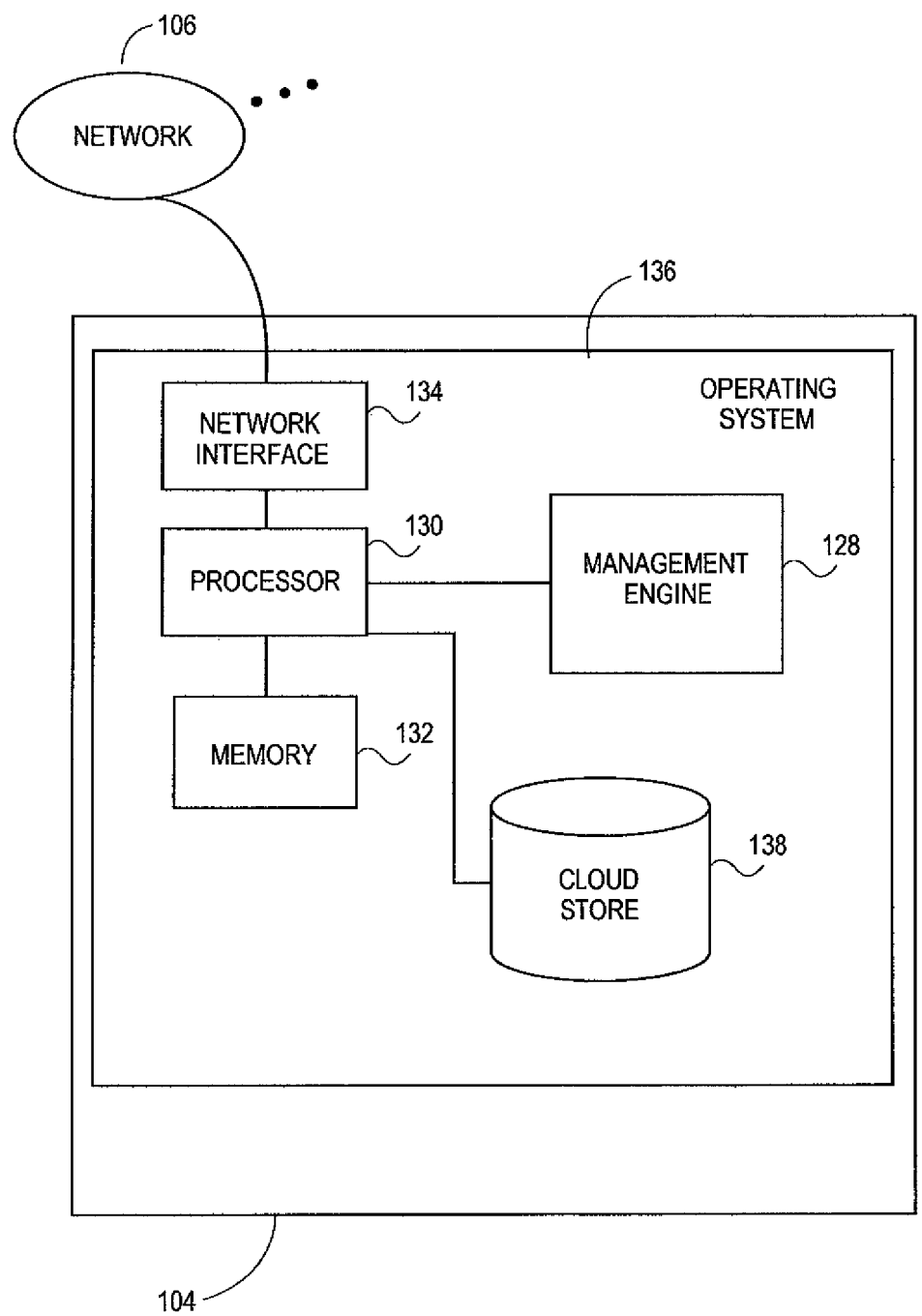
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with set of instantiated virtual machines 116 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with could store 138 and management engine 128, to execute control logic and control the operation of virtual machines and other resources in cloud 102. Other configurations of cloud management system 104, associated network connections, and other hardware and software resources are possible.

Figure 5:
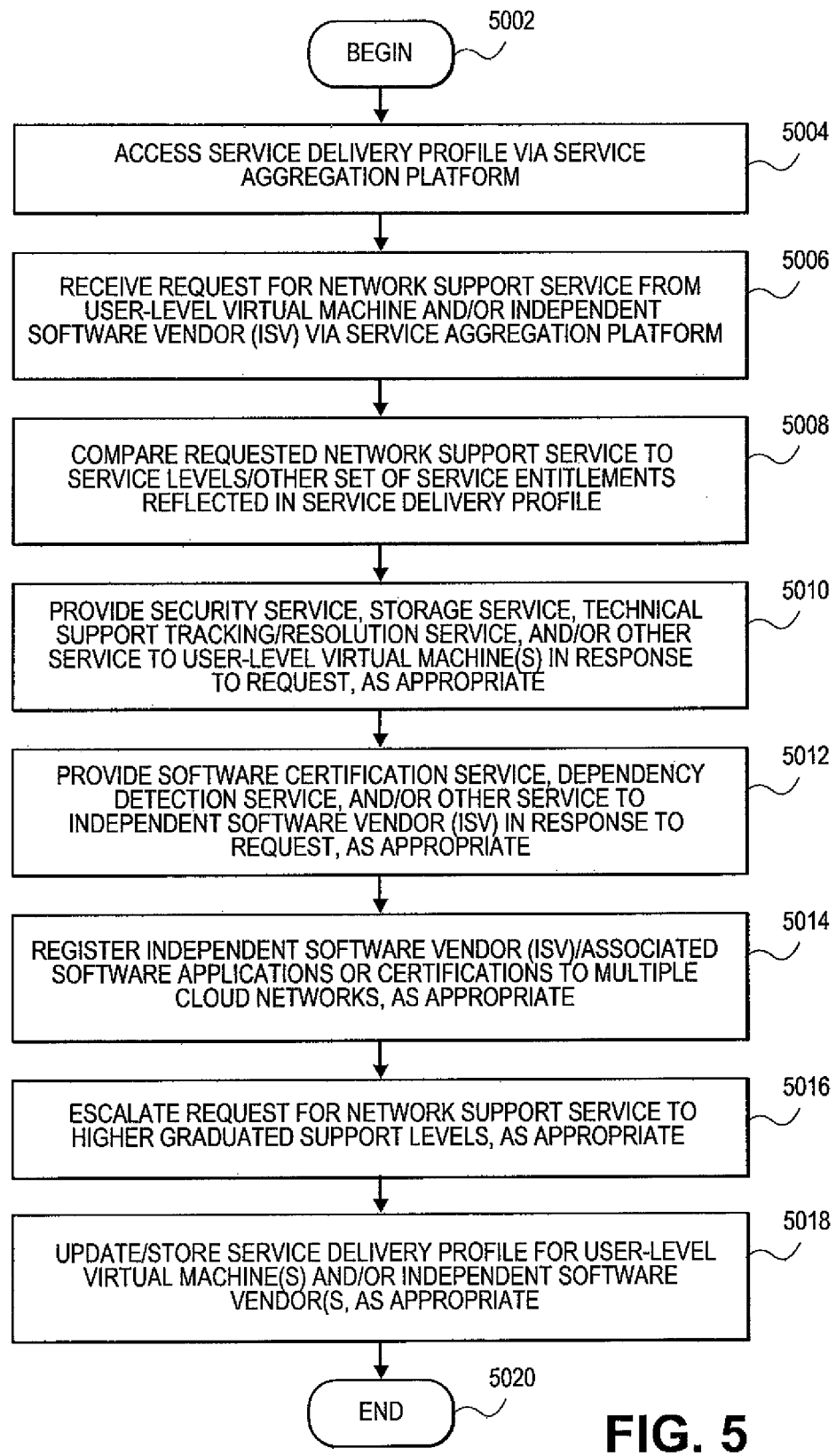
FIG. 5 illustrates a flowchart for overall service aggregation and delivery processing in a cloud computing environment, according to various embodiments.

FIG. 5 illustrates overall processing that can be used in systems and methods for service aggregation using graduated service levels in a cloud network, according to various embodiments. In 5002, processing can begin. In 5004, service delivery profile 504 can be accessed via service aggregation platform 502 and/or other logic, portals, or services. In 5006, one or more request for network support service(s) can be received via service aggregation platform 502. In aspects, the request for network support service(s) can be received from one or more user-level virtual machines in set of user virtual machines 512. In aspects, the request for network support service(s) can in addition or instead be received form one or more vendors in set of independent software vendors 516, and/or from other sources. For example, in aspects, a request for network service(s) can be received from a system in set of cloud management systems 514, and/or other sources.

In 5008, service aggregation platform and/or other logic can compare the requested network support service(s) to the service levels and/or other set(s) of service entitlements reflected in the service delivery profile 504 for the requesting entity or entities. In aspects as noted, service delivery profile 504 can comprise one or more vendor service profile 506 reflecting services to which vendor(s) in set of independent software vendors (ISVs) 516 or other vendors are entitled, directly or on their own behalf. In aspects as also noted, service delivery profile 504 can comprise one or more user-level service profile 508 reflecting services to which one or more user-level machine in set of user virtual machines 512 is entitled, directly and/or via set of cloud management systems 514, set of independent software vendors (ISVs) 516, and/or other nodes, sites, or entities. In 5010, service aggregation platform 502 can initiate, provide, and/or access services to a requesting user-level virtual machine or machines, such as security service(s), storage service(s), communications service(s), technical support tracking and/or resolution service(s), and/or other services in response to the request, as appropriate. In 5012, service aggregation platform 502 can initiate, provide, and/or access services to a requesting independent software vendor or vendors, such as software certification service(s), dependency detection service(s), and/or other services in response to the request, as appropriate. In aspects, various of the aforementioned services and/or other services can be provided to either or both of set of independent software vendors (ISVs) 516, set of user virtual machines 512, and/or other entities requesting network support services, including hardware, software, and/or other support services.

In 5014, one or more independent software vendor and/or software applications provided by or associated with those vendors can be registered to multiple cloud networks in set of cloud networks 510, as appropriate. In aspects, one, some, or all of the vendors in set of independent software vendors (ISVs) 516 may choose to register to various multiple clouds in set of cloud networks 510. In aspects, one, some, or all of the vendors in set of independent software vendors (ISVs) 516 may choose to register to one cloud in set of cloud networks 510. Other configurations of set of cloud networks 510 and set of independent software vendors (ISVs) 516 hosted in set of cloud networks 510 can be used.

In 5016, service aggregation platform 502 can escalate, heighten, or otherwise change the priority, level, and/or status of the request for network support service(s), as appropriate. In aspects, the set of network support services provided or delivered via service aggregation platform 502 can be broken into graduated levels or categories, such as, for instance, level 1 (L1) for initial user-level technical support, level 2 for next-stage user-level technical support, and/or level 3 (L3) for intensive user support, cloud-wide support, multiple-cloud support, and/or other higher-level research and/or support for users and/or vendors themselves. For instance, if a vendor has reported a security breach in a secure database application or other software or service, service aggregation platform 502 can escalate the service level or service intensity to L3 for that vendor and/or its users. In 5018, service aggregation platform 502 can update and/or store any newly-registered or changed service delivery profile 504 for any new of updated user-level virtual machines, vendor(s), and/or other requesting entities. in In 5020, processing can repeat, return to a prior processing point, jump to a further processing point, or end.

The foregoing description is illustrative, and variations in configuration and implementation may occur to persons skilled in the art. For example, while embodiments have been described which operate using one service aggregation platform 502, in embodiments, one or more of service aggregation platform 502 and/or other servers, data stores, and/or other logic or resources can be used. For further example, while embodiments have been described in which some services are delivered or provided to support a set of user virtual machines 512, in embodiments, the service requirements of various physical machines can also or instead be managed via service aggregation platform 502. Similarly, while embodiments have been described in which support and service to user-level machines are delivered, in embodiments, service and support can be managed and delivered to a variety of user-level, systems-level, network-level, and/or other machines, nodes, or resources via service aggregation platform 502. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:

receiving, by a service aggregation server executed by a processor, a first request from a first independent software vendors (ISV) for a first type of support service, wherein the first ISV is associated with a first cloud network for a first software application provisioned through the first cloud network and a second cloud network, the first cloud network providing a plurality of software applications from a plurality of independent software vendors (ISVs), wherein the first request comprises a first resource requirement, wherein the service aggregation server maintains a vendor service profile for each of the plurality of ISVs, as well as a user-level service profile for their respective end-users, the vendor service profile defining a set of support services to which each particular ISV of the plurality of ISVs is entitled from or via the service aggregation server and the user-level service profile defining service entitlements for the end-users of the respective software application across the first cloud network and the second cloud network;

comparing, by the service aggregation server, the first request for the first type of support service to a service entitlement for the first ISV recorded in a first vendor service profile associated with the first ISV, wherein the first vendor service profile specifies a first service delivery profile with one or more service entitlements for the first ISV and a second service delivery profile with one or more service entitlements for one or more end-users of the first software application, the one or more service entitlements for the one or more end-users being defined by the first ISV for the first software application and encompassing at least one service variable by which the one or more end-users can access support services for the first software application initiated, provided, or hosted by the first ISV; and:

providing, by the service aggregation server, to the first ISV, the first type of the support service, specified in the first vendor service profile, wherein the providing the first type of the support service comprises at least one of provisioning a first set of one or more virtual machines or configuring the first set of one or more virtual machines, according to the first resource requirement, to deliver the first type of the support service to the first ISV;

receiving, by the service aggregation server, a second request from a first end-user of the first software application in the first cloud for a second type of support service, wherein the second request comprises a second resource requirement;

comparing, by the service aggregation server, the second request for the second type of support service to a service entitlement for the first end-user recorded in the second service delivery profile for the one or more end-users, wherein the user-level service profile specifies a plurality of graduated support service levels defined by the first ISV; and providing, by the service aggregation server, to the first end-user, the second type of the support service, specified in one of the plurality of graduated support service levels, wherein the second type of the support service is different from the first type of the support service, wherein the providing the second type of the support service comprises at least one of provisioning a second set of one or more virtual machines or configuring the second set of one or more virtual machines, according to the second resource requirement, to deliver the second type of the support service to the first end-user.

2. The method of claim 1, wherein the first end-user is at least one user-level virtual machine hosted in the first cloud network.

3. The method of claim 2, wherein the second type of support service comprises at least one of a security service, a storage service, or a technical support resolution service.

4. The method of claim 1, wherein the first request for the first type of support service comprises an escalation request to process a previously requested support service received via a user-level virtual machine.

5. The method of claim 1, wherein the first cloud network and the second cloud network are part of a plurality of cloud networks, and wherein the first ISV is registered in each of the plurality of cloud networks.

6. The method of claim 1, wherein the first ISV is hosted via a vendor server in the Internet.

7. The method of claim 1, wherein the first ISV is hosted via a virtual machine hosted in the first cloud network or the second cloud network.

8. The method of claim 1, wherein the first type of support service comprises at least one of a software certification service or a dependency detection service.

9. The method of claim 1, wherein a response to the first request for the first type of support service or a response to the second request for the second type of support service are generated via a service aggregation platform hosted via the service aggregation server in the Internet.

10. The method of claim 1 wherein a response to the first request for the first type of support service or a response to the second request for the second type of support service are generated via a service aggregation platform hosted via the service aggregation server in a virtual machine hosted in the first cloud network or the second cloud network.

11. The method of claim 1, further comprising updating, by the processor, a status of the first request in view of an update in the service entitlement recorded in the user-level service profile associated with the first end-user.

12. The method of claim 1, further comprising:
receiving, by the service aggregation server, a third request for the second type of support service from a second end-user of the software application associated with the second cloud network, wherein the second cloud network comprises at least one of different underlying hardware resources or different compatibility issues than the first cloud network, wherein the third request comprises a third resource requirement;
comparing, by the service aggregation server, the third request to a service entitlement for the second end-user recorded in the user-level service profile; and providing, by the service aggregation server, a third type of the support service in view of the comparison of the second request to the service entitlement, wherein the providing the third type of the support service comprises at least one of provisioning a third set of one or more virtual machines or configuring the third set of one or more virtual machines, according to the third resource requirement, to deliver the third type of the support service.

13. A system, comprising:
a memory to store instructions of a service aggregation server, the service aggregation server to maintain a vendor service profile for each of a plurality of vendors of software applications, as well as a user-level service profile for their respective end-users, the vendor service profile defining a set of support services to which each particular vendor of the plurality of vendors is entitled from or via the service aggregation server and the user-level service profile defining service entitlements for the end-users of their respective software application across multiple cloud environments;
a processor, operatively coupled to the memory, to execute the instructions of the service aggregation server to:
receive a first request for a support service from a requesting entity associated with a first cloud network, wherein the requesting entity is a first end-user of a software application associated with a vendor and provisioned through the first cloud network, wherein the request comprises a first resource requirement;
compare the request for the support service to a service entitlement for the requesting entity recorded in a first user-level service profile associated with the first end-user, wherein the first user-level service profile specifies the service entitlement for the first end-user, the service entitlement being defined by the vendor for the software application and encompassing at least one service variable by which the first end-user can access the support services for the software application initiated, provided, or hosted by the vendor;
provide, to the first end-user, a first type of the support service, specified in the service entitlement, in view of the comparison of the first request to the service entitlement recorded in the first user-level service profile, wherein the service aggregation server, to provide the first type of the support service, is to at least one of provision a first set of one or more virtual machines or configure the first set of one or more virtual machines, according to the first resource requirement, to deliver the first type of the support service;
receive a second request for the support service from a second requesting entity associated with the first cloud network, wherein the second request comprises a second resource requirement, wherein the second request is an escalation request to process the first request previously requested by the first end-user;
compare the second request to a service entitlement for the second requesting entity recorded in a vendor service profile associated with the vendor of the software application, wherein the vendor service profile specifies a plurality of graduated support service levels for the one or more end-users of the software application; and provide a second type of the support service, specified in the plurality of graduated support service levels, in view of the comparison of the second request to the service entitlement recorded in the vendor service profile, wherein the service aggregation server, to provide the second type of the support service, is to at least one of provision a second set of one or more virtual machines or configure the second set of one or more virtual machines, according to the second resource requirement, to deliver the second type of the support service.

14. The system of claim 13, wherein the requesting entity comprises a user-level virtual machine hosted in the first cloud network, and wherein the second requesting entity comprises at least one of a vendor server or a virtual machine hosted in the first cloud network.

15. The system of claim 13, wherein the processor is further to update a status of the first request in view of an update in the service entitlement recorded in the user-level service profile associated with the first end-user.

16. The system of claim 13, wherein the processor is further to:
receive a third request for a third type of support service from a second end-user of the software application associated with a second cloud network, wherein the second cloud network comprises at least one of different underlying hardware resources or different compatibility issues than the first cloud network, wherein the third request comprises a third resource requirement;
compare the third request to a service entitlement for the second end-user recorded in the user-level service profile; and
provide a third type of the support service in view of the comparison of the second request to the service entitlement, wherein, to provide the third type of the support service, is further to at least one of provision a third set of one or more virtual machines or configure the third set of one or more virtual machines, according to the third resource requirement, to deliver the third type of the support service.

17. The system of claim 14, wherein the first type of the support service comprises one of a security service, a storage service, or a technical support resolution service.

18. The system of claim 17, wherein the first cloud network is part of a plurality of cloud networks, and the vendor is registered to each of the plurality of cloud networks.

19. A non-transitory computer readable storage medium having instructions that, when executed by a processor, cause the processor to:
maintain, by the processor, a vendor service profile for each of a plurality of vendors of software applications, as well as a user-level service profile for their respective end-users, the vendor service profile defining a set of support services to which each particular vendor of the plurality of vendors is entitled from or via the processor and the user-level service profile defining service entitlements for the end-users of their respective software application across multiple cloud environments;
receive, by the processor, a first request for a first type of support service from a requesting entity associated with a first cloud network, wherein the requesting entity is a first end-user of a software application associated with a vendor and provisioned through the first cloud network, wherein the first request comprises a first resource requirement;
compare, by the processor, the first request for the first type of support service to a service entitlement for the requesting entity recorded in a user-level service profile associated with the first end-user, wherein the user-level service profile specifies the service entitlement for the first end-user, the service entitlement being defined by vendor for the software application and encompassing at least one service variable by which the first end-user can access the support services for the software application initiated, provided, or hosted by the vendor;
provide, by the processor, to the first end-user, the first type of the support service, specified in the service entitlement, in view of the comparison of the first request to the service entitlement recorded in the user-level service profile, wherein the processor, to provide the first type of the support service, is to at least one of provision a first set of one or more virtual machines or configure the first set of one or more virtual machines, according to the first resource requirement, to deliver the first type of the support service;
receive a second request for a second type of support service from a second requesting entity associated with the first cloud network, wherein the second request comprises a second resource requirement, wherein the second request is an escalation request to process the first request previously requested by the first end-user;
compare the second request to a service entitlement for the second requesting entity recorded in a vendor service profile associated with the vendor, wherein the vendor service profile specifies a plurality of graduated support service levels; and
provide the second type of the support service, specified in the plurality of graduated support service levels, in view of the comparison of the second request to the service entitlement recorded in the vendor service profile, wherein the processor, to provide the second type of the support service, is to at least one of provision a second set of one or more virtual machines or configure the second set of one or more virtual machines, according to the second resource requirement, to deliver the second type of the support service.

20. The non-transitory computer readable storage medium of claim 19, wherein the vendor is hosted via a vendor server in a public network.

21. The non-transitory computer readable storage medium of claim 19, wherein the processor further to:
receive a third request for a third type of support service from a second end-user of the software application associated with a second cloud network, wherein the second cloud network comprises at least one of different underlying hardware resources or different compatibility issues than the first cloud network, wherein the third request comprises a third resource requirement;
compare the third request to a service entitlement for the second end-user recorded in the user-level service profile; and
provide a third type of the support service in view of the comparison of the second request to the service entitlement, wherein, to provide the third type of the support service, is further to at least one of provision a third set of one or more virtual machines or configure the third set of one or more virtual machines, according to the third resource requirement, to deliver the third type of the support service.

* * * * *